J. L. WALKER.
COUPLING.
APPLICATION FILED OCT. 17, 1908.
934,028.
Patented Sept. 14, 1909.
2 SHEETS—SHEET 1.
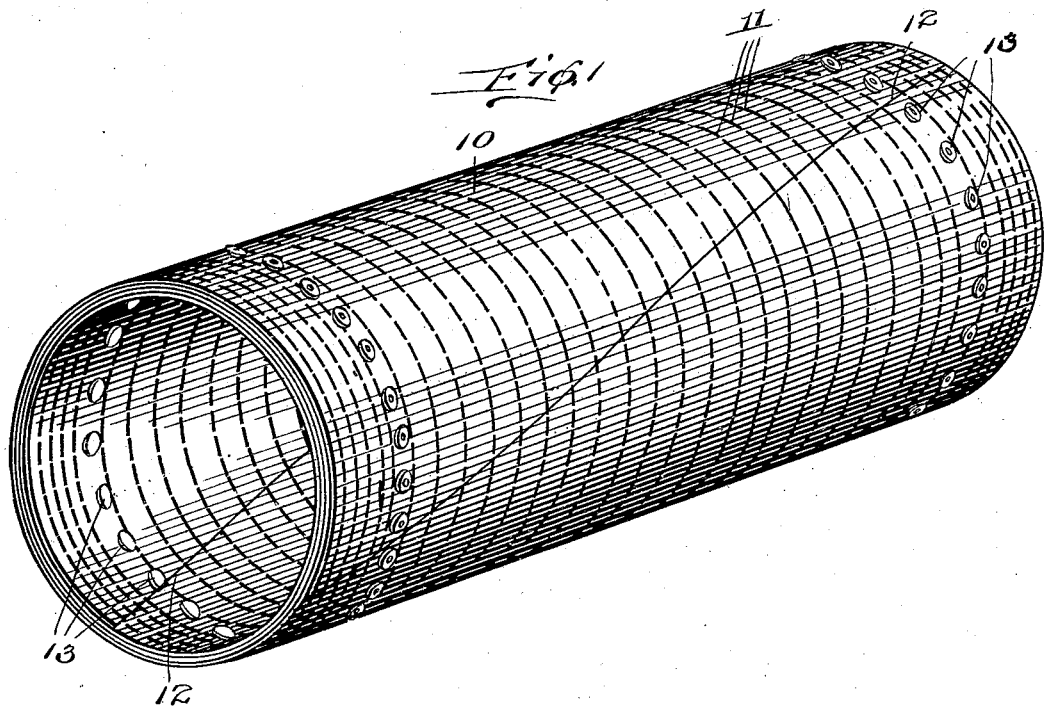
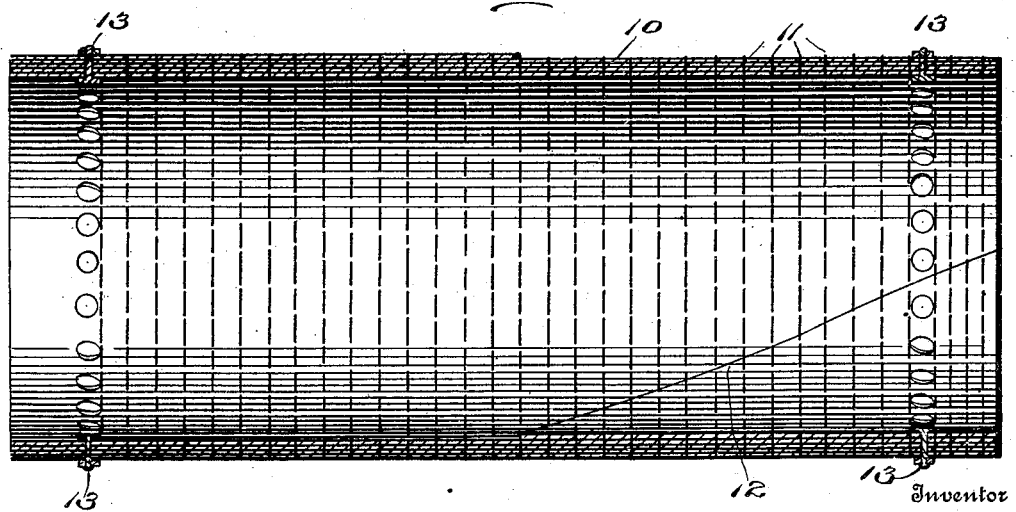
Witnesses
J. M. Fowler Jr.
L. L. Morrill.
Inventor
John L. Walker,
By Mason Fenwick & Lawrence,
Attorneys J. L. WALKER.
COUPLING.
APPLICATION FILED OCT. 17, 1908.
934,028.
Patented Sept. 14, 1909.
2 SHEETS—SHEET 2.
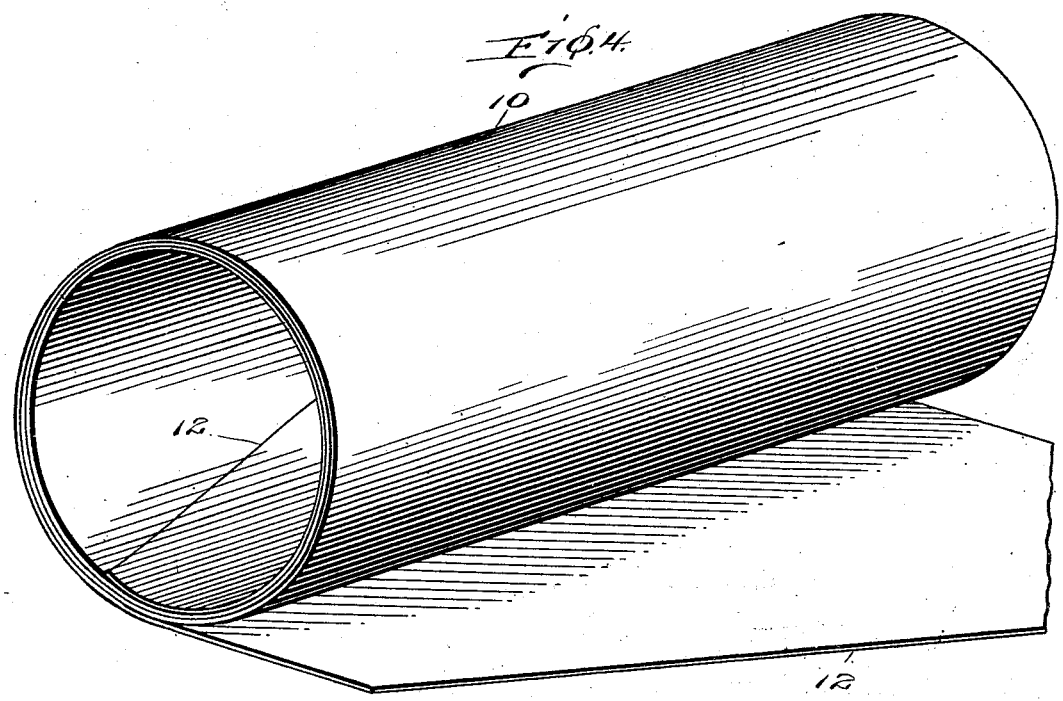
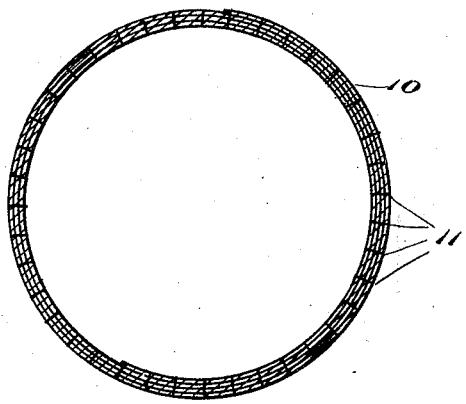
Witnesses
J. M. Fowler Jr.
L. L. Morrell
Inventor
John L. Walker,
By Mason, Fenwick & Lawrence,
His Attorneys

UNITED STATES PATENT OFFICE.

JOHN LAURENCE WALKER, OF MOBILE, ALABAMA.

COUPLING.

934,028.   Specification of Letters Patent.   Patented Sept. 14, 1909.

Application filed October 17, 1908. Serial No. 458,289.

*To all whom it may concern:*

Be it known that I, JOHN L. WALKER, a citizen of the United States, residing at Mobile, in the county of Mobile and State of Alabama, have invented certain new and useful Improvements in Couplings; and I do hereby declare the following to be a full, clear, and exact description of the invention, such as will enable others skilled in the art to which it appertains to make and use the same.

This invention relates to flexible couplings for various purposes, as for instance, for coupling discharge pipes from hydraulic dredges and the like, and has for an object to provide a coupling of the class embodying new and improved features of economy, durability and reliability.

A further object of the invention is to provide a flexible pipe as a substitute for the rubber pipes now employed, such flexible coupling being composed wholly of woven or similarly produced fabric in successive convolutions or laminations, such convolutions being secured together by securing means.

A further object of the invention is to provide a flexible coupling composed of successively wound layers of canvas or other suitable fabric secured together by closely disposed rows of stitching running about the circumference of the cylinder so produced and with means adjacent the ends of the flexible cylinder for engaging a band to connect such flexible coupling with the iron or other pipe with which it is associated.

With these and other objects in view, the invention comprises certain novel constructions, combinations and arrangements of parts, as will be hereinafter fully described and claimed.

In the drawings:—Figure 1 is a perspective view of a coupling made in accordance with the present invention. Fig. 2 is a longitudinal, sectional view of the coupling. Fig. 3 is a transverse sectional view of the coupling. Fig. 4 is a view of the process of forming the coupling showing the coupling partly rolled.

Like characters of reference designate corresponding parts throughout the several views.

The improved coupling forming the subject-matter of this application is composed of a web of fabric or any kind 10, preferably, though not necessarily canvas, the said web being rolled in the form of a cylinder with any desired number of convolutions producing laminations, and such convolutions or laminations securely united by means of stitching 11 running about the cylinder so formed, preferably for convenience of manufacture, such stitching running spirally in rows closely adjacent to each other throughout the entire length of the cylinder and so near together as to appear circumferential instead of spiral except upon tracing the rows entirely around the tube.

To prevent raveling of the fabric and consequent damage to the cylinder and producing means for attaching and holding material passing therethrough, the ends of the fabric, both the inner end and the outer end, are cut on a line diagonal to the edge of the fabric or in the expression ordinarily employed in relation to fabric, cut on the bias, as shown at 12.

The flexible coupling is designed to be associated with iron or other pipes by means of bands clamped within or without or both within and without the ends of such flexible coupling and to prevent such bands or collars slipping from their proper engagement with the coupling, means is employed as the rivets 13 inserted through the fabric adjacent the ends of the cylinder and producing thereby a thickening of the material at that point past which the bands or collars will not readily pass.

The coupling above described being principally employed for dredging operations it will be apparent that the mud and other sediment being forced through the pipes is quickly and readily lodged in the meshes and interstices of the fabric and the holes produced by the sewing to fill such interstices and holes, thereby producing in association with the fabric cylinder a practically water-tight coupling of economical construction and great durability.

What I claim is:—

1. A flexible coupling comprising a fabric wound in successive convolutions, stitching extending continuously entirely about the circumference, and attachment securing means independent of the stitching.

2. A flexible coupling comprising a fabric wound in successive convolutions, stitching extending continuously entirely about the circumference and rivets inserted entirely through the convolutions at spaced intervals adjacent the ends.

In testimony whereof I affix my signature in presence of two witnesses.

JOHN LAURENCE WALKER.

Witnesses:
  JOHN V. FALCK,
  H. A. KUFER.